United States Patent [19]

Dixon

[11] 4,266,580
[45] May 12, 1981

[54] LOADING AND UNLOADING SYSTEM FOR TANK CAR TRAINS

[76] Inventor: Frank O. Dixon, 9 Thurgate Crescent, Thornhill, Ontario, L3T 4G4, Canada

[21] Appl. No.: 64,614

[22] Filed: Aug. 7, 1979

[30] Foreign Application Priority Data

Aug. 10, 1978 [GB] United Kingdom .............. 32860/78

[51] Int. Cl.³ .............................................. B65B 3/04
[52] U.S. Cl. ..................................... 141/35; 105/360; 137/572; 137/575; 141/196; 141/198
[58] Field of Search ....................... 105/1 R, 358, 360; 137/256, 572, 575; 141/1, 35, 94, 95, 98, 192, 196, 198, 231-233, 302

[56] References Cited

U.S. PATENT DOCUMENTS

| 3,897,807 | 8/1975 | Hurst et al. ..................... 141/35 X |
| 4,002,192 | 1/1977 | Mowatt-Larssen .................. 141/35 |
| 4,079,760 | 3/1978 | Hurst ............................. 141/35 |

*Primary Examiner*—Frederick R. Schmidt
*Attorney, Agent, or Firm*—Arne I. Fors; Robert F. Delbridge

[57] ABSTRACT

A system and apparatus are disclosed for automatically sequentially loading and unloading railway tank cars from a single station. A novel valve arrangement in combination with a liquid sensor permits tank cars to be loaded or unloaded in sequence with each car after it is filled being isolated from the loading system to provide a straight flow path for the liquid directly from the station to the tank car to be loaded or unloaded.

10 Claims, 5 Drawing Figures

LOADING AND UNLOADING SYSTEM FOR TANK CAR TRAINS

BACKGROUND OF THE INVENTION

This invention relates to railway tank cars and, in particular, is directed to manifolded tank cars which have a novel valve and conduit system to facilitate loading and unloading of said tank cars.

The provision of fluid communication among interconnected tank cars in a railway train of tank cars is known. U.S. Pat. No. 3,897,807 discloses basically four different piping systems for tank cars which may be characterized as follows: (1) series flow, top load and unload; (2) series flow, top load and bottom unload; (3) parallel flow, top load, bottom unload with parallel top vapour vent; and (4) series flow, centre load and unload.

U.S. Pat. No. 4,007,766 discloses another system which could be categorized as (5) series flow, top load and unload with parallel vapour vent collection. Also, U.S. Pat. No. 4,008,739 discloses a system which is (6) series flow, top or bottom load and unload. U.S. Pat. No. 3,675,670 discloses another arrangement of system(1) above, i.e. series flow, top load and unload.

The system of the present invention differs from the foregoing systems and may be categorized as (7) automatic sequential flow, top load with top or bottom unload.

Some of the essential differences between the present system and conventional systems are as follows. All of the known series and parallel flow arrangements limit the loading pressure by the rated working pressure of the tank car. This pressure normally is about 60-75 psig for a conventional car and can only be increased by special design and strengthening of the car. The series flow systems are particularly limited by the rated working pressure of the tank car since all tank cars, including loaded tank cars, form an integral part of the liquid flow path. However, the automatic sequential flow of liquid permitted by the present invention by-passes each loaded car. For this reason the pressure at the loading station may be increased as successive cars are loaded so that a more constant rate of flow and hence faster loading time can be attained.

The resistance to flow of piping for known series flow systems during unloading is greater than that of automatic sequential unloading according to the present invention. The tank cars according to the present system do not form an integral part of the flow path and, hence, automatic sequential flow substantially increases unloading flow rates with similar sized conduits and air or inert gas pressure driving forces.

Known series flow systems for loading and unloading form a single point have declining flow rates and hence practical limits to the number of cars which may be connected. Automatic sequential flow allows much larger numbers of cars to be coupled in a string. This advantage allows much greater flexibility of train configuration and is adaptable to many different track layouts.

The valves in known systems do not operate sequentially but are all either in the open or closed position. For this reason, the operator cannot tell how far a loading or unloading operation has progressed until it is finished. With automatic sequential flow, the operator can observe the progress of the operation by noting the position of valve indicator flags at the cars which will tell him which car is in the process of loading or unloading.

If valves fail to operate in a series flow system, the operation must stop until the problem is remedied. However, with automatic sequential flow, other cars normally can continue to load or discharge automatically while any valve problems are being corrected.

In some circumstances, tank cars must be short loaded because of gross car weight limitations and known systems cannot achieve this without modification of the internal piping. The automatic sequential system can accomplish this simply by locating an auxiliary level switch at the appropriate level in the car.

The cost of a surge tank for pump protection at unloading sites can be saved by adapting the final car in an automatic sequential system to perform this function.

In that a train of automatic sequential tank cars may be quite long and need not necessarily be broken at the loading/unloading sites, it is adaptable to a special system which could include a loading/unloading pump and instrument control and purge apparatus on a separate car which forms part of the unit train. Such a completely self-sufficient train would be of value to users who do not wish to invest in costly loading/unloading equipment.

SUMMARY OF THE INVENTION

The present invention provides a railway tank car for a unit train which permits loading and unloading liquid from a train of said cars from a single location. The tank car of my invention comprises in essence a wheeled vehicle supporting a liquid storage tank, a first pipe extending vertically within the tank with an open end terminating in proximity to the bottom of the tank, a second pipe extending vertically into the tank with an open end terminating near the top of the tank, a liquid conduit extending across the top of the tank in communication with the said first and second pipes, and valve means for closing the first and second pipes and opening the conduit for isolating the tank from the conduit and for opening the first and second pipes and closing the conduit between the first and second pipes for loading or unloading the liquid. More particularly, the first pipe is in communication with the liquid conduit on the upstream side of the said conduit and the second pipe is in communication with the liquid conduit on the downstream side of the said conduit during loading of the tank, and a liquid sensor in the conduit downstream of the second pipe is operably connected to the valve means and operable during loading and unloading of the tank whereby the first and second pipes are open and the conduit between the pipes is closed until the sensor detects a liquid at which time the sensor actuates the valve means to close the first and second pipes and to open the conduit between the pipes.

BRIEF DESCRIPTION OF THE DRAWINGS

The embodiments of my invention will now be described with reference to the accompanying drawings, in which:

Like reference characters refer to like parts throughout the description of the drawings.

Referring now to FIG. 1, a railway train designated by numeral 10 and comprising three railway tank cars 12 is illustrated at a loading and unloading station 14. The tank cars each comprise two pairs of wheels 16 journalled in trucks or chassis 18 at the opposite ends thereof for rolling engagement with rail tracks. Each tank car has a coupler 22 at each end for connecting adjacent cars together in series as typified by the three cars illustrated.

With reference to FIGS. 2 and 3, each elongated tank 24 mounted on trucks 18 has a main conduit 26 extending longitudinally thereof adjacent tank top 28 with flanges 30 at each end connected in series with conduits 26 of adjacent tanks 24 by flexible conduits 32 extending therebetween. The conduits 32 between the cars, interconnected by couplings 33, are flexible to accommodate the relative motions of the cars in transit. Flexible conduits 32 may be relatively long, as shown, to minimize stresses caused by relative motion of the cars, or may be shorter of stronger material and terminate close to the ends of the car with a short connector 35, as depicted in FIG. 1.

With reference to FIGS. 1 and 2, each tank car 12 is equipped with a trio of valves 34, 36 and 38, one of which 36 is located in the main conduit 26 and the other two of which are located in branch conduits or pipes 40,42 which extend downwardly from conduit 26 into the tank. The first of the pipes 40 extends down to near the bottom of the tank and the other 42 extends to a short distance below the top of the car for reasons which will become apparent as the description proceeds. The cars are equipped with a liquid level sensor 46 in the main conduit 26 in proximity to valve 38, preferably downstream thereof when loading the tank cars. This sensor may be a mechanical device, or an electrical one.

Any such device that would reliably respond to changes in density, pressure, flow or temperature would serve the desired purpose. FIG. 5 illustrates a suitable sensor 46 comprising a float 48 supported by a rod 50 passing through a protective sealing diaphragm 52 and through pipe wall 54 into cylindrical housing 56 of non-magnetic material in axial alignment therewith. The upper end of rod 50 has a permanent magnet 58 secured thereto and a compression spring 60 concentric therewith between magnet 58 and pipe wall 54. Spring 60 substantially balances the weight of float 48 and rod 50 to enhance the sensitivity of the sensor.

Figure 5:
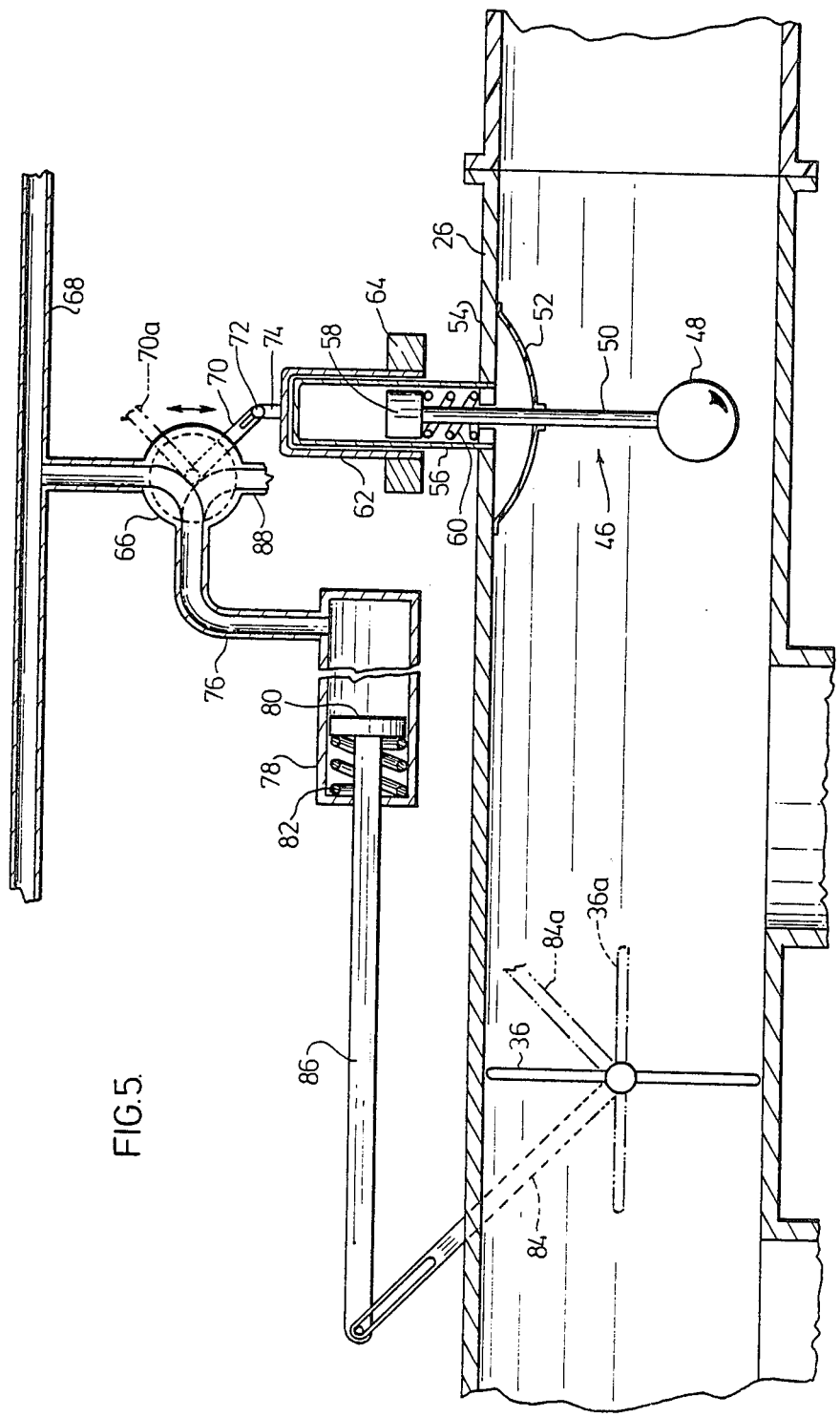
FIG. 5 is a longitudinal section of a liquid sensor and valve control mechanism.

A cylindrical sleeve 62 concentric with housing 56 and slidably mounted thereon for reciprocal movement has an annular magnet 64 secured thereto at its lower end adapted for vertical reciprocal travel with the magnet 58 secured to rod 50 whereby upward travel of float 48 as viewed in FIG. 5, due to the presence of liquid in conduit 26, causes sleeve 62 to travel upwardly a like distance.

Rotary air valve 66 in pneumatic line 76 is operably connected to sleeve 62 by slotted valve extension 70 and stub shaft 72 extending from sleeve extension 74 whereby valve 66 is in a normally open position when no lading is in the conduit, as illustrated, permitting air to flow from line 68 through line 76 to pneumatic cylinder 78 and urge piston 80 to the left, as viewed in FIG. 5, against the bias of compression spring 82, to close butterfly valve 36 by pivoting slotted link 84 to the position illustrated, by reciprocal travel of piston rod 86. When pneumatic line 68 is depressured as when no loading or unloading is taking place, valve 36 is in an open position, designated by broken lines 36a. When air pressure is applied to pneumatic line 68 as during loading and unloading, valve 36 is urged to the closed position as illustrated. When conduit 26 is full and valve extension 70 is in the position 70a permitting air in cylinder 78 to vent to the atmosphere through line 76 and outlet 88, clockwise pivotal movement of link 84 to the position designated by broken lines 84a, under the bias of compression spring 82 on piston 80, returns valve 36 to the open position designated by broken lines 36a.

Similar pneumatic lines would be in communication with valves 34,38 such that these latter valves would be open when valve 36 is closed, and vice versa.

A mechanical-pneumatic sensor control is preferred in that an air supply is available from the train braking system or can be made available from an independent instrument air supply. However, a mercury switch arrangement such as a RECO (Trademark) float controller is suitable in combination with an electrical supply for actuating control solenoids and electrically or pneumatically driven valves.

Indicator flags, not shown, can be operatively connected to the valve assemblies to show the status of the valves, i.e. whether the valves are open or closed.

Figure 1:
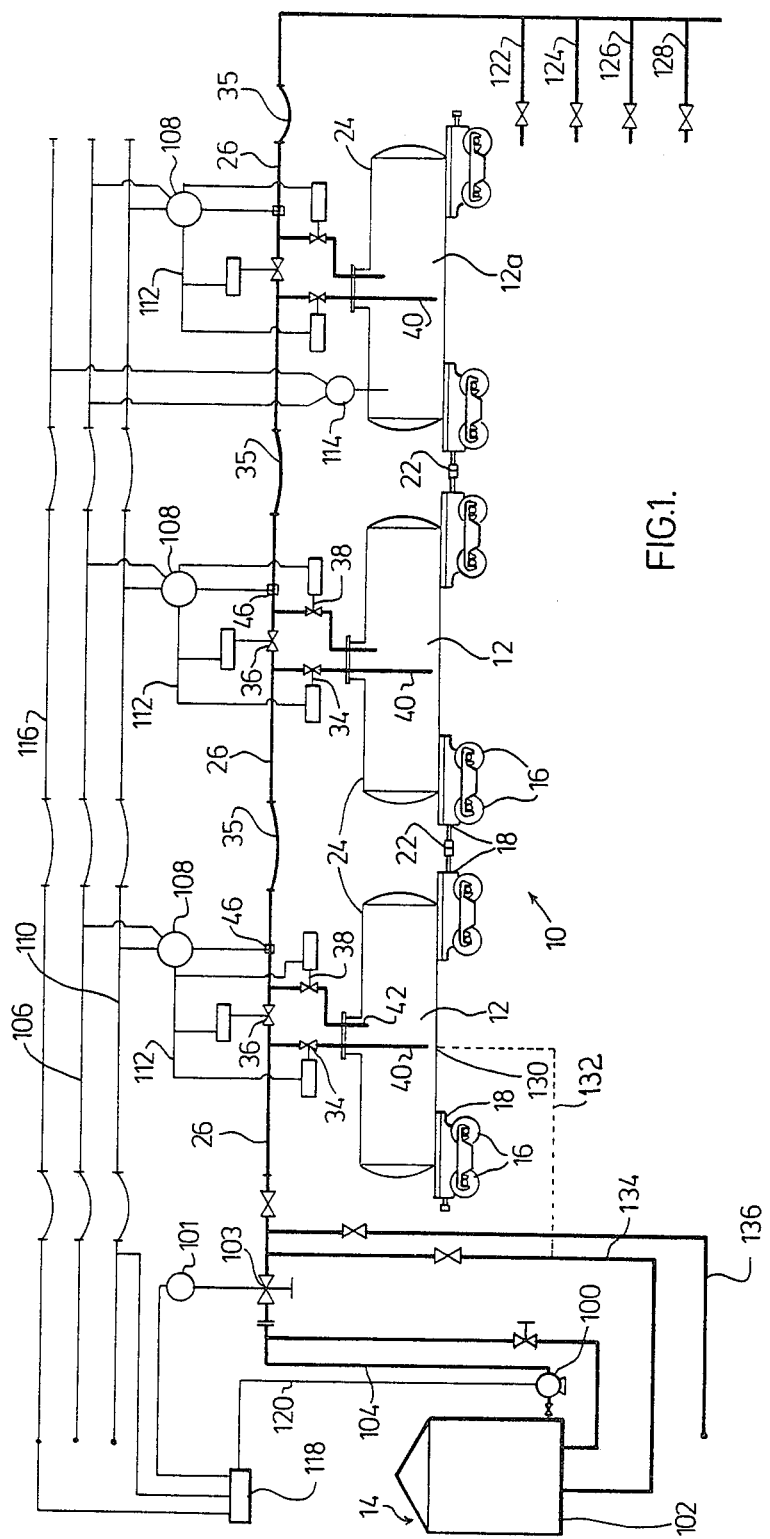
FIG. 1 is a side elevation view of a railway train comprising tank cars of the invention coupled together at a loading or unloading location.

FIG. 1 illustrates schematically a system of piping and valves at a loading/unloading station 14. A pump 100 is adapted to transfer the liquid contents of storage tank 102 to first car 12 via lines 104, 26 and 40, valves 34 and 38 being open and valve 36 closed. Line 106 depicts an electrical service line, if used, supplying control mechanisms 108 of sensors 46. Pneumatic line 110 alternatively supplies air to the control mechanisms 108 which preferably would be controlled by mechanical sensors of the type described above. Lines 112 can be pneumatic or electric lines for actuating the valves 34, 36 and 38.

The final car 12a in a string of cars may have a variable level switch 114, shown electrically energized, for determining when the last car is full and sending a signal via line 116 to relay 118 which in turn controls power supply line 120 to pump 100 and flow control 101 and valve 103 in line 104.

Numeral 122 designates a line to a vapour recovery system, numeral 124 a line to a flare, numeral 126 a line to an overflow vessel or to atmosphere, and line 128 a line to a source of compressed air or inert gas for unloading of the tank cars.

Figure 2:
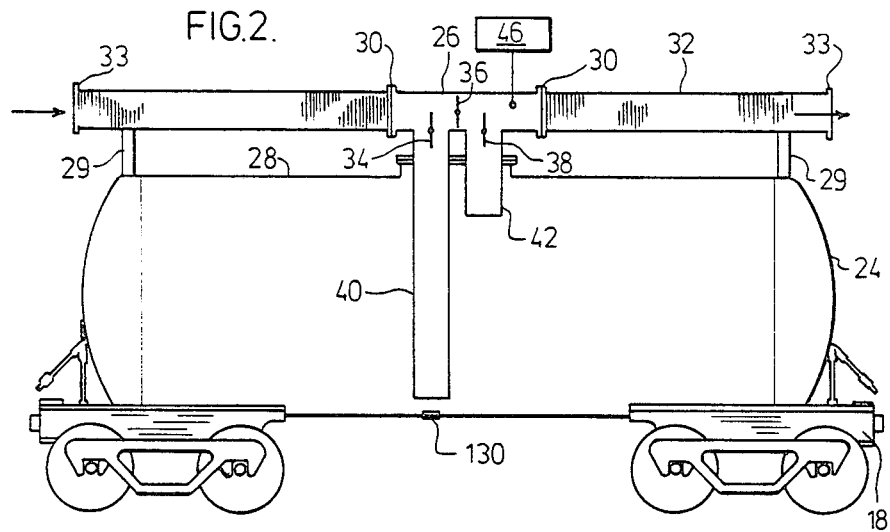
FIG. 2 is a schematic illustration of piping and valves in side elevation of a tank car in accordance with and embodying features of a first embodiment of my invention showing a loading/unloading valve arrangement.
Figure 4:
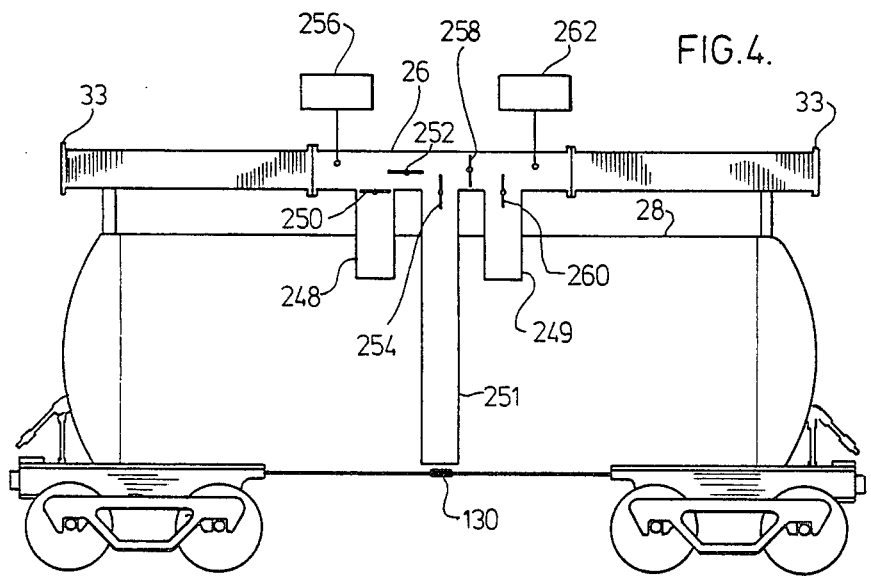
FIG. 4 is a schematic illustration of another embodiment of piping and valves in side elevation of a tank car permitting loading/unloading from either end of a tank car.

Each car has a bottom outlet 130, FIGS. 1, 2 and 4, for bottom unloading if desired via broken line 132 shown connected to discharge line 134.

Line 136 is a pneumatic line connected to the tank car supply line for purge of liquid from the tank car conduits.

In operation, air or other source of power is applied only at the loading or unloading sites to open valves 34,38 and close valve 36. A liquid cargo is pumped by pump 100 from tank 102 at a constant rate through line 104, flow controller 103 and line 26 to downpipe 40 which fills first tank car 12 to the height of the bottom of pipe 42. The liquid then flows through pipe 42 and line 26 past sensor 46 which detects the presence of the liquid and immediately closes valves 34,38 and concurrently opens valve 36 to isolate first tank car 12 and enable direct flow of liquid through flexible conduit 32 to the second tank car 12 where the procedure is repeated automatically and sequentially until the last car 12a is reached.

Variable level switch 114 is then actuated signalling relay 118 and flow control 101 to close valve 103 and de-energize pump 100. Gases displaced from the tank cars as they are sequentially filled may be recovered, flared or purged to atmosphere, as desired.

Figure 3:
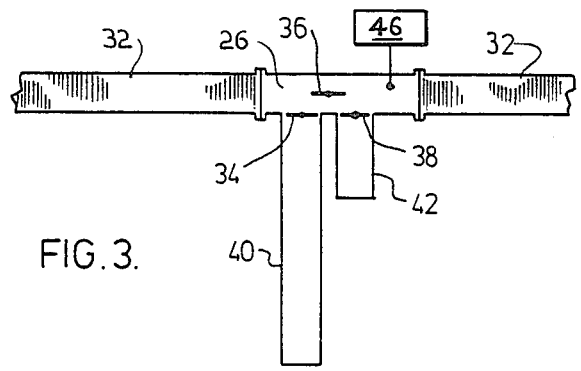
FIG. 3 is an isolated schematic view of the piping and valves illustrated in FIG. 2 showing a tank by-pass arrangement.

Air or an inert gas under pressure can be introduced to the system through line 136 to purge the conduits upon completion of loading and the train of tank cars moved with the valves arranged in their normally at-rest positions as shown in FIG. 3 to maintain the tank cars isolated from each other.

For unloading of the tank cars, air or an inert gas under pressure is introduced by line 128 and, in that the sensors 46 detect no liquid, valves 34 and 38 are open and valve 36 closed allowing liquid to flow out from tank 12a through pipe 40. The liquid sensors 46 downstream of tank car 12a during unloading, i.e. in the tank cars between tank car 12a and tank 102, re-isolate each of the tank cars except tank car 12a to provide a straight flow path for the liquid directly from the car unloaded to the unloading station.

When the first tank car is unloaded, air or inert gas follows the liquid to the next car. The level sensor in this car detects no liquid, therefore it permits the valves 34, 36 and 38 to assume the loading/unloading position shown in FIG. 2. This process carries on until the entire train is unloaded with the cars unloaded automatically and sequentially.

FIGS. 1 and 2 show a piping arrangement which brings the long and short branch conduits 40,42 into the tank car via the manway on top. This is a convenient and normally a least costly way to convert existing conventional cars. However, an alternative design is to bring the branch conduits into the car at any other point which may be closer to either end of the tank car. Also, if greater flow rates for loading or unloading are desired, a duplicate conduit system may be added.

Provision can be made to make the design more flexible such that the cars may be loaded and unloaded from either end. This is accomplished by adding two more valves 250,252, a third branch conduit 248 and a second level sensor 256 as shown in FIG. 4. Operation of valves 250, 252 and 254 would be governed by liquid sensor 256 and operation of valves 254, 258 and 260 would be governed by liquid sensor 262 using appropriately energized activation mechanisms. The mechanisms and loading and unloading sequences would be identical to those described above regardless of the orientation of the cars.

A variation of the design shown in FIG. 4 is the extension of branch conduits 248 and 249 to near the bottom of the tank and the shortening of branch conduit 251. In this last embodiment valves 250, 252 and 254 would be governed by liquid sensor 262 and valves 254, 258 and 260 by liquid sensor 256.

What I claim as new and desire to protect by Letters Patent of the United States is:

1. A tank car for transporting a liquid comprising: a wheeled vehicle supporting a liquid storage tank, a first pipe extending vertically within the tank with an open end terminating in proximity to the bottom of the tank, a second pipe extending vertically into the tank with an open end terminating near the top of the tank, a liquid conduit in proximity to the top of the tank in communication with the said first and second pipes, and valve means for closing the first and second pipes and opening the conduit for isolating the tank from the conduit and for opening the first and second pipes and closing the conduit between the first and second pipes for loading liquid into or unloading liquid from the tank.

2. A tank car as claimed in claim 1 in which the first pipe is in communication with the liquid conduit on the upstream side of the said conduit and the second pipe is in communication with the liquid conduit on the downstream side of the said conduit during loading of the tank, and a liquid sensor in the conduit downstream of the second pipe is operably connected to the valve means and operable during loading and unloading of the tank whereby the first and second pipes are open and the conduit between the pipes is closed until the sensor detects a liquid at which time the sensor actuates the valve means to close the first and second pipes and to open the conduit between the pipes.

3. A tank car as claimed in claim 2 in which the valve means comprises normally-closed valves in the first and second pipes and a normally-open valve in the conduit.

4. A tank car as claimed in claim 3 in which each of said valves is a spring-loaded butterfly valve.

5. A tank car as claimed in claim 3 or 4 in which said valves are pneumatically actuated by an air valve in communication with a supply of air under pressure and said liquid sensor comprises a float disposed within the conduit and means for transmitting displacement of the float due to the presence of a liquid in the conduit to the air valve for control of the air valve.

6. A railway tank car train for loading and unloading a liquid from a single location and for transporting said liquid comprising, in combination: a plurality of railway tank cars connected in series with each other, each of said tank cars comprising a wheeled chassis having coupling means for connecting the tank cars together, a liquid storage tank mounted on the chassis, a liquid conduit extending across the top of the tank having coupling means at each end for connecting the conduit to conduits on adjacent tank cars whereby the tank cars are interconnected in series, a first pipe in communication with the conduit extending vertically within the tank with an open end terminating in proximity to the bottom of the tank, a second pipe in communication with the conduit extending vertically into the tank with an open end terminating near the top of the tank, and valve means for opening the first and second pipes and closing the conduit between the first and second pipes for loading or unloading liquid into and from the tank and for closing the first and second pipes and opening the conduit for isolating the tank from the conduit when the tank is loaded.

7. A railway tank car train as claimed in claim 6 in which the first pipe is in communication with the liquid conduit on the upstream side of the said conduit and the second pipe is in communication with the liquid conduit on the downstream side of the said conduit during loading of the tank, and a liquid sensor in the conduit downstream of the second pipe is operably connected to the valve means and operable during loading and unloading of the tank whereby the first and second pipes are open and the conduit between the pipes is closed until the sensor detects a liquid at which time the sensor actuates the valve means to close the first and second pipes and to open the conduit between the pipes.

8. A railway tank car train as claimed in claim 7 in which the valve means comprises normally-closed valves in the first and second pipes and a normally-open valve in the conduit.

9. A railway tank car train as claimed in claim 8 in which each of said valves is a spring-loaded butterfly valve.

10. A railway tank car train as claimed in claim 8 or 9 in which said valves are pneumatically actuated by an air valve in communication with a supply of air under pressure and said liquid sensor comprises a float disposed within the conduit and means for transmitting displacement of the float due to the presence of a liquid in the conduit to the air valve for control of the air valve.

* * * * *